USOO5626221A

United States Patent [19]
Ledingham

[11] Patent Number: 5,626,221
[45] Date of Patent: May 6, 1997

[54] TAPERED CLAMP SUPPORT ROD

[75] Inventor: Stuart J. Ledingham, Coto de Caza, Calif.

[73] Assignee: Valu Engineering, Inc., Irvine, Calif.

[21] Appl. No.: 539,988

[22] Filed: Oct. 6, 1995

[51] Int. Cl.⁶ .................................................. B65G 21/20
[52] U.S. Cl. .................................. 198/836.3; 198/836.1
[58] Field of Search ............................ 198/836.1, 836.3

[56] References Cited

U.S. PATENT DOCUMENTS

| | | | |
|---|---|---|---|
| 3,776,350 | 12/1973 | Tile | 198/836.3 |
| 4,470,499 | 9/1984 | Sijbrandij | 198/836.3 |
| 4,502,594 | 3/1985 | Sijbrandij | 198/836.3 |

FOREIGN PATENT DOCUMENTS 0074805   4/1984   Japan ................................. 198/836.1

OTHER PUBLICATIONS

Valu Guide Conveyor Components, Technical Folio No. 115, Sep. 1987.

*Primary Examiner*—James R. Bidwell
*Attorney, Agent, or Firm*—Knobbe, Martens, Olson & Bear, LLP

[57] ABSTRACT

A tapered clamp support rod of a rail guide support assembly provides quick and easy insertion and positioning of the rod in a mounting bracket of a conveyor system. The rod may be formed of a plastic which is easily cut to a shorter, less hazardous length.

20 Claims, 3 Drawing Sheets

TAPERED CLAMP SUPPORT ROD

BACKGROUND OF THE INVENTION

1. Field of the Invention

The present invention relates generally to conveyor systems, and in particular, to a rail guide assembly for gripping and supporting a guide rail.

2. Description of the Related Art

Guide rails are commonly used in conveyor systems to guide objects down a predetermined path and prevent the objects from moving laterally off a track or belt of the system. Rail guide support assemblies often comprise clamps supported by rods to position and support the guide rails. Some clamps are of one-piece manufacture, while other clamps may have three pieces. Clamps often include a long support rod which can present a safety hazard to individuals in proximity to the belt or track of the conveyor system.

One type of existing clamp comprises a clamp made of flexible material. The flexible material allows a user to cut the support rod portion of the clamp to shorten the length of the rod. Due to the flexibility of the material, however, a guide rail may not be securely held by the clamp, thereby allowing the rail to undesirably pivot within the grip of the clamp.

Another type of clamp system consists of separate top and bottom clamp halves and a rod. This three-piece system is awkward to handle upon insertion and removal of the rail because one half of the clamp must be held in place against the rod and aligned with the second half before the two clamp halves can be screwed into place. Also, the rod and clamp halves must be held secure during the entire assembly process.

However, both of the aforementioned types of clamps involve a rather imprecise and awkward procedure of inserting and positioning of the support rod in a mounting bracket of the conveyor system. That is, the rod is not easily manipulated by an installer to be secured in the mounting bracket.

SUMMARY OF THE INVENTION

In accordance with one aspect of the present invention, there is provided a rail guide assembly for gripping and supporting a guide rail having an elongate support rod having a proximal end and a tapered distal end. The assembly also comprises a clamp which is attached to the proximal end of the support rod. In one embodiment, the clamp comprises two clamp halves and a fastener whereby the first and second clamp halves are securely fastened.

The distal end of the support rod is tapered by an angle between about zero and ten degrees, and in a preferred embodiment the tapering angle is about three degrees. Thus, the rod is easily inserted into a mounting bracket of the conveyor system which in one embodiment includes an eye ring. The rod is readily received through the eye ring for securing of the assembly in the bracket.

In a preferred embodiment, a first clamp half has an inner surface and a base having a flat upper surface and a rounded bottom surface. The base extends perpendicular to and past the proximal end of the support rod and a notch is formed in the inner surface of the first clamp half. Preferably, the second clamp half has an inner surface and comprises a wedge extending from the inner surface and is adapted to be inserted into the notch in the first clamp half. Also preferably, the two clamp halves comprise a hole extending therethrough, and the fastener comprises a bolt and threaded nut. Alternatively, the fastener comprises a screw.

Preferred materials of the support rod and two clamp halves include polyamide, polyethylene, acetal or any other plastic. Although, the rod may also be formed from a metal material.

In another preferred embodiment, the support rod is semicircular and further comprises an integral vertical bar disposed along the longitudinal axis of the rod. A plurality of integral ribs extend laterally from the longitudinal axis of the support rod to give the rod added strength. Alternatively, the support rod can be a solid cylinder having a tapered distal end.

In yet another preferred embodiment of the present invention, the rail guide assembly further comprises at least one peg extending out from the inner surface of the first clamp half, and at least one corresponding hole on the inner surface of the second clamp half. The pegs act to secure the two halves together upon insertion of the peg into the hole.

Further advantages and applications will become apparent to those skilled in the art from the following detailed description and the drawings referenced herein.

DETAILED DESCRIPTION OF THE PREFERRED EMBODIMENTS

Figure 1:
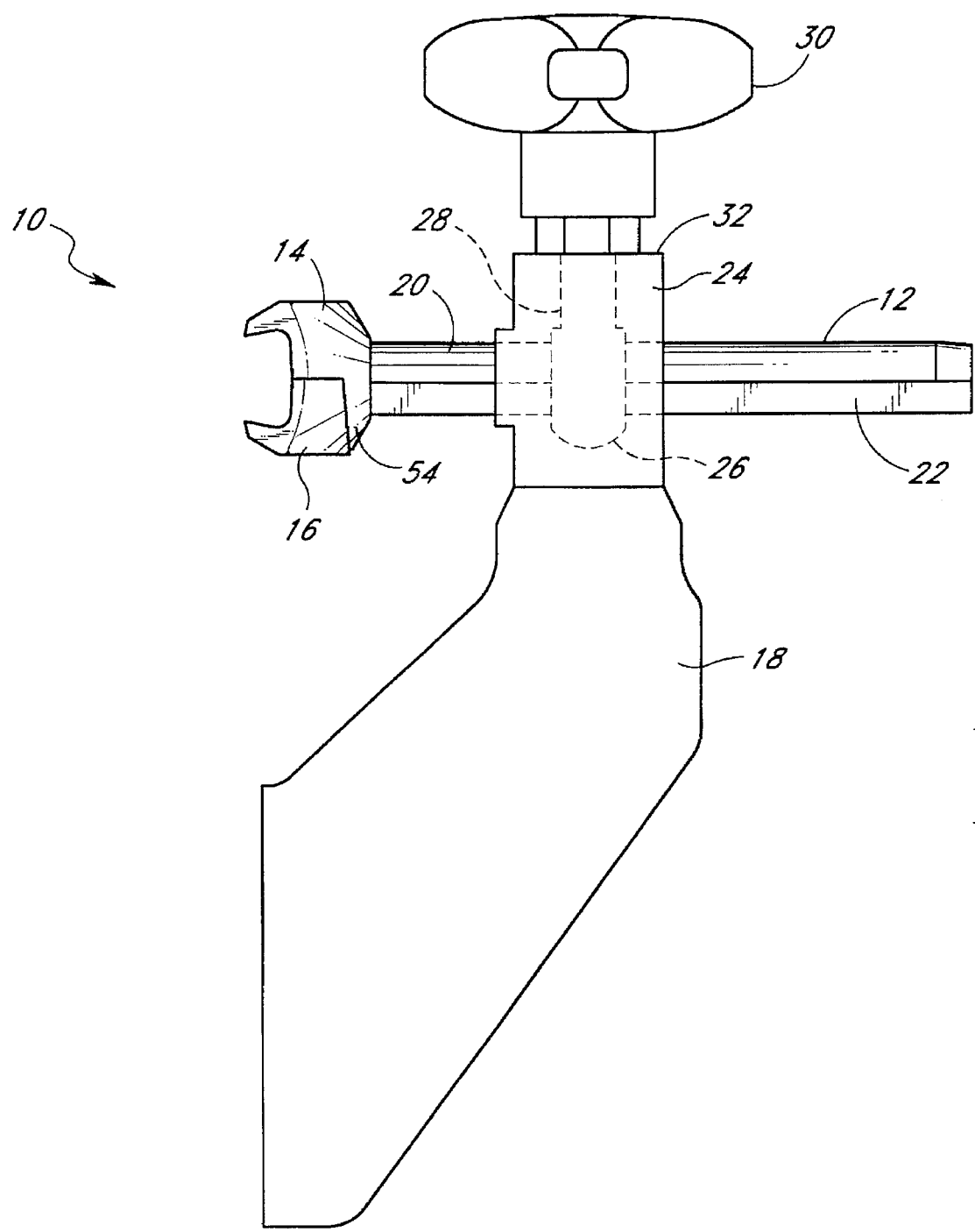
FIG. 1 is a side elevational view illustrating a preferred embodiment of a rail guide support assembly of the present invention mounted in a bracket.

Referring to FIG. 1, a preferred embodiment of the present invention comprises a rail guide support assembly 10 having a tapered clamp support rod 12 integrally attached to a first clamp half 14, together with an interlocking second clamp half 16, for securely gripping and supporting a guide rail (not shown). The integrated construction of the support assembly 10 enables the user to quickly and easily secure the clamp halves 14, 16, and the tapered support rod 12 enables the user to quickly and easily insert and secure the support rod 12 in a mounting bracket 18 of a conveyor structure (not shown).

The tapered support rod of the present invention is not limited to use with the clamp described herein, and may alternatively be used with any clamp as will be appreciated by those of ordinary skill in the art.

Referring to FIG. 1, a preferred embodiment of a rail guide support assembly 10 constructed in accordance with the present invention is shown mounted in a typical bracket 18, which is usually positioned along both sides of the conveyor structure as will be easily understood by those of skill in the art. The bracket 18 is secured to the conveyor structure using conventional fasteners in a manner known to those of ordinary skill in the art. Preferably, the first clamp half 14 and the rod 12 are molded and manufactured as a single piece. Alternatively, the first clamp half 14 and support rod 12 may be manufactured from two pieces. The second clamp half 16 is adapted to be removably secured to the first clamp half 14. The assembly 10 is preferably formed of a synthetic material, such as polyamide, polyethylene, acetal or another plastic, but can also be formed of metal or other suitable material as will be understood by those skilled in the art.

It can be seen in FIG. 1 that the clamp halves 14, 16 are located at proximal end 20 of the rod 12 and a distal end 22 of the rod 12 is received through an opening in an upper portion 24 of the bracket 18. An eye ring 26 having a threaded shaft 28 secured to an adjusting knob 30 is shown in phantom in FIG. 1. The ring 26 is inserted into a slot (not shown) on an upper face 32 of the bracket 18. Rotation of the knob 30 results in a tightening of the ring 26 against the rod 12 and the rod 12 against the upper surface of the opening in the bracket 18, thereby securing the rod 12 with respect to the bracket 18. Other fastening methods which are well known in the art may alternatively be used for securing the rod 12 to the bracket 18.

Previous support rods are generally awkward to position accurately in the opening of the bracket 18 for insertion through the eye ring 26 which is obscured from the view of the installer. Tapering at the distal end 22 of the support rod 12 of the present invention, however, affords an ease in properly positioning the support rod 12 through the eye ring 26 so that the assembly 10 is quickly and easily secured within the bracket 18.

Figure 2:
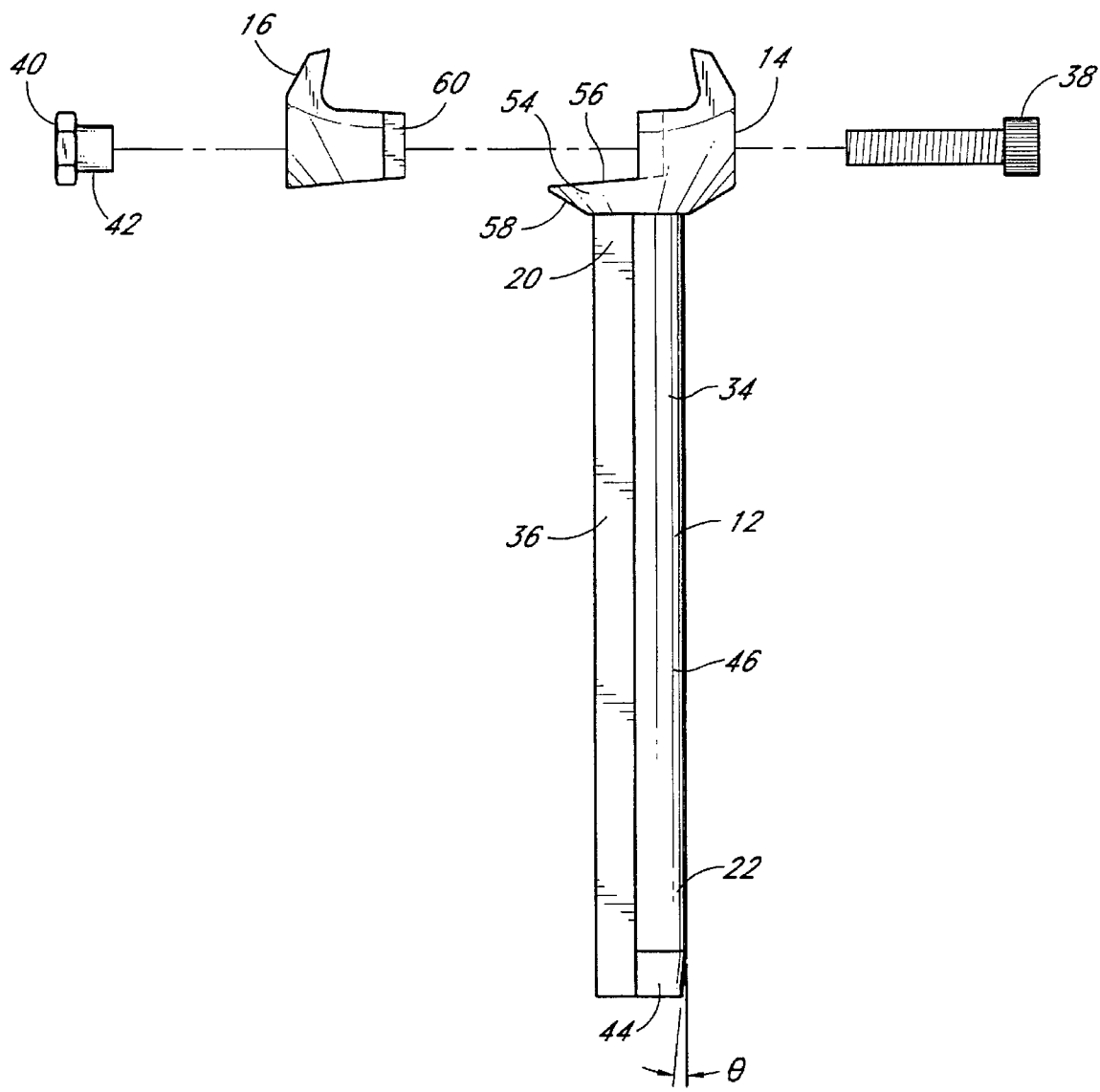
FIG. 2 is an exploded side view of a preferred embodiment of the rail guide support assembly of the present invention, illustrating each of the components separately.
Figure 3:
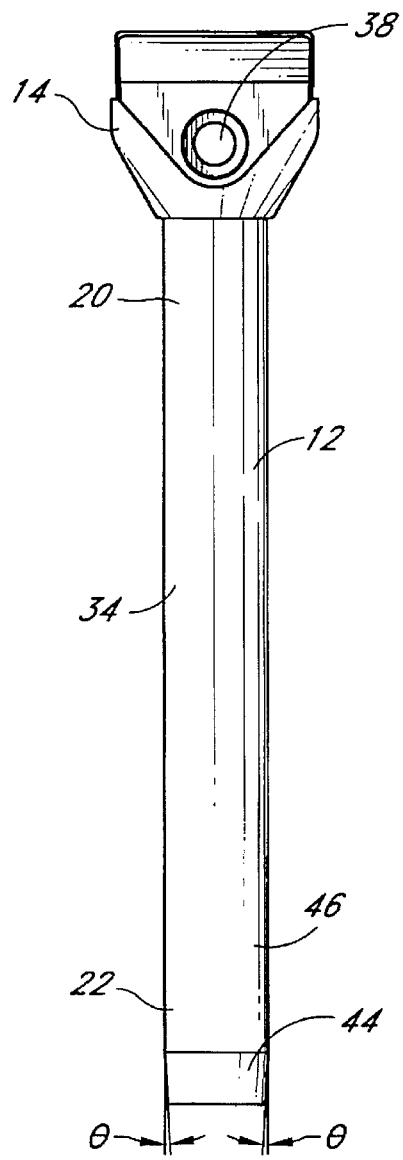
FIG. 3 is a top plan view of the rail guide support assembly, illustrating a first clamp half on a proximal end of the support rod, the rod having a tapered distal end.

FIG. 2 more clearly illustrates the integrated construction of the support assembly 10. The first clamp half 14 is on the proximal end 20 of a first longitudinal portion 34 of the support rod 12, and the second clamp half 16 is attached at a second longitudinal portion 36 of the proximal end 20. In this preferred embodiment, a bolt 38 and a nut 40 having a threaded sleeve portion 42 are used to fasten the two clamp halves 14, 16 together. Preferably, the total length of the assembly 10 is about 5.13 inches with the support rod 12 comprising about 4.25 inches of the length. Referring to FIGS. 2 and 3, it is preferred that a tapered portion 44 of the distal end 22 of the rod 12 comprises about 0.25 inches. However, it is contemplated that the tapered portion 44 of the support rod 12 may comprise any length of the rod 12, as desired.

Figure 4:
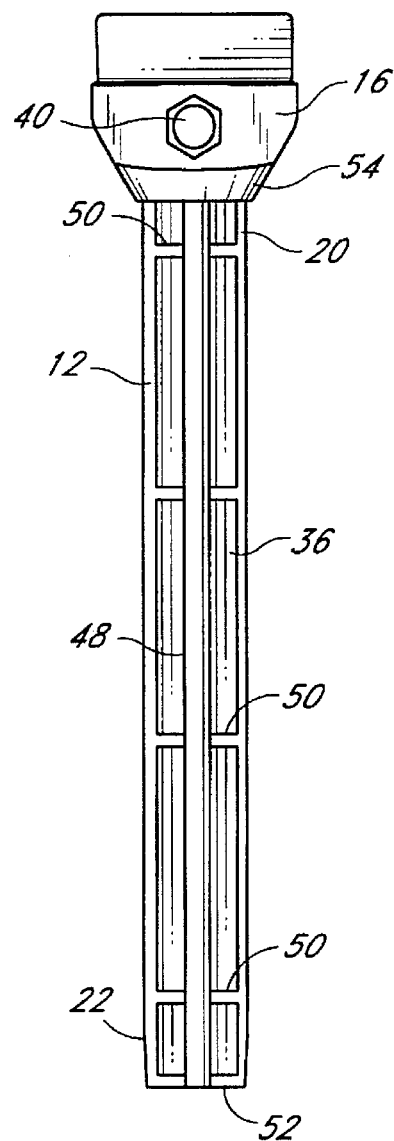
FIG. 4 is a bottom plan view of the rail guide support assembly, illustrating a second clamp half and cavities on a lower portion of the support rod.
Figure 5:
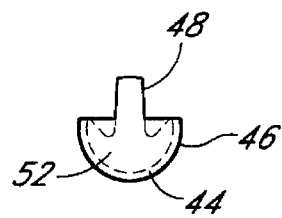
FIG. 5 is an end elevational view of the distal end of the support rod.

As best seen in the end view of FIG. 5, an outer surface 46 of the first portion 34 of the support rod 12 is preferably semicircular in shape. FIG. 5 also shows the tapering of the portion 44 with respect to the surface 46 of the support rod 12. Referring to FIG. 4, the rod 12 is strengthened by the inclusion of an integral vertical bar 48 located along the longitudinal axis of the rod 12. In this preferred embodiment, a plurality of integral ribs 50 extend laterally from the axis of the rod 12 to provide additional strength. Moreover, the vertical bar 48 aids in securing the rod 12 in a support such as the bracket 18. The ribs 50 are preferably spaced approximately ¼ to 2 inches apart, and more preferably ½ to 1 inch apart. Alternatively, a hollow or cylindrical rod may be used in accordance with the present invention, and the rod may be formed of plastic, metal or any other suitable material as will be understood by those skilled in the art.

It is preferred that the tapering of the distal end 22 of the support rod 12 forms an angle θ between about zero and ten degrees. Most preferably, the angle θ is about 3 degrees. The angle θ is measured from a plane tangent to the curved outer surface 46 of the support rod 12, and the tapering preferably commences near one rib 50 of the rod 12 and extends distally toward an end face 52 of the rod 12.

The proximal end 20 of the support rod 12 may be integral with the first clamp half 14. It is understood, however, that the second clamp half 16 as described herein may alternatively be integral with the support rod 12. Moreover, neither of the clamp halves 14, 16 may be integral with the support rod 12. Referring to FIG. 2, a base 54 of the first clamp half 14 extends perpendicular to the longitudinal axis of the rod 12. This base or shelf 54 is preferably in the shape of a half-oval and has a flat inner surface 56 and a rounded outer surface 58. The base 54 acts to prevent rotation of the clamp halves 14, 16 and aids the user during alignment and attachment of the two halves. Moreover, the rounded outer surface 58 of the base 54 prevents the accumulation of dust, fluids and debris on the rail guide support assembly 10.

The second clamp half 16 is adapted to be interlocking with the first clamp half 14. As shown in FIG. 2, a protrusion or wedge 60 extending from the second clamp half 16 into a corresponding recess or notch (not visible) in the first clamp half 14 facilitates alignment of the halves and acts to minimize movement of the clamp halves 14, 16 once they are secured. In another preferred embodiment, movement of the halves is further minimized by the use of two pegs (not shown) which extend from one half into the other, preventing lateral movement of the clamp halves even when the halves are spaced apart to allow for insertion or removal of a guide rail. The pegs also help secure the grip of the clamp and minimize rotation of the guide rail within the grip of the clamp.

The threaded nut 40 of the preferred fastening means shown in FIG. 2 is preferably formed of a nickel-plated brass, and the preferred bolt 38 is preferably formed of stainless steel. Although, it is understood by those skilled in the art that other metals and suitable materials may also be used for both the bolt 38 and the nut 40. Also preferably, the nut 40 is secured within the second clamp half 16 through an interference fit, such that the nut 40 may not slide with respect to the clamp half 16.

The nut 40 is preferably hexagonal and has a distally extending cylindrical sleeve 42. Both the nut 40 and the cylindrical sleeve 42 are threaded to accommodate the bolt 38. The threaded sleeve 42 enables the bolt 38 to engage the nut 40 while the two clamp halves 14, 16 are not yet firmly secured together. This enables a guide rail to be inserted or removed from the rail guide assembly 10 without removing the second clamp half 16 from the first clamp half 14. This aids in the cleaning and replacement of the guide rails without disconnection of the clamp halves 14, 16.

Generally, the shape of the clamp halves 14, 16 prevents lateral and rotational movement of the clamp halves and guide rail. The shelf surface at the base 54 of the first clamp half 14 extends perpendicular to the axis of the rod 12 and acts to prevent rotation of the guide rail. The surface also aids the user during alignment and attachment of the two halves 14, 16. The inner surface of each clamp half 14, 16 is adapted to conform to the shape of a particular guide rail, ensuring a secure grip. That is, the guide rail may be cylindrical, may be substantially U-shaped or may have another shape as will be readily understood by those of skill in the art.

The support rod 12 constructed in accordance with the present invention mates with many existing support brackets. The cross-sectional configuration of the tapered support rod 12 may alternatively be cylindrical, oval, triangular or another cross-sectional configuration without loss of the advantages of the present invention. The smooth, curved outer surface 46 of the support rod 12 prevents the accumulation of dust, liquids and other debris. Although the rod 12 may not be cylindrical, it is strengthened by the addition of the support bar 48 along its axis and ribs 50 extending laterally from the axis of the rod 12. Thus, the support rod 12 of the present invention may be manufactured less expensively compared with conventional solid cylindrical rods, without sacrificing structural integrity.

The interlocking notch and wedge 60 minimize movement of the clamp halves 14, 16 and act to prevent bowing of the clamp halves and lateral movement thereof. The notch and wedge 60 allow the user to secure the two clamp halves 14, 16 before the bolt 38 is inserted and tightened, making handling and assembly of the device less awkward. Further, the use of the bolt 38 and threaded sleeved nut 40 provide that the bolt 38 may be tightened with one hand while the guide rail is held with the other hand, allowing for easy use of the support assembly 10. The tapered additional feature of the present invention of a tapered end 44 of the support rod 12 provides the improved advantage of easily inserting and securing the rod 12 in the mounting bracket 18.

The embodiments illustrated and described above are provided merely as examples of the rail guide support assembly of the present invention. Other changes and modifications can be made from the embodiments presented herein by those skilled in the art without departure from the spirit and scope of the invention, as defined by the appended claims.

What is claimed is:

1. A rail guide assembly for gripping and supporting a guide rail, comprising:

an elongate support rod, said support rod having a proximal end, a tapered distal end, and a plurality of ribs extending laterally to the longitudinal axis of said rod, wherein said tapering commences at about the most distal rib; and a guide rail clamp attached to said proximal end of said support rod.

2. The assembly of claim 1, wherein said rod further comprises a vertical support bar located substantially along the longitudinal axis of said rod.

3. The assembly of claim 1, wherein an upper half of said rod forms a semi-circular arc.

4. The assembly of claim 1, wherein an upper half of said rod forms a semi-circular arc integrally formed with said ribs.

5. The assembly of claim 2, wherein an upper half of said rod forms a semi-circular arc integrally formed with said support bar.

6. The assembly of claim 1, wherein said ribs are spaced at least one inch apart.

7. The assembly of claim 1, wherein said ribs are spaced at least one and one-half inches apart.

8. The assembly of claim 1, wherein said assembly has at least four ribs.

9. The assembly of claim 1, wherein said assembly has no more than four ribs.

10. The assembly of claim 1, wherein said clamp comprises a first half and a second half, said clamp having an inner gripping surface and an outer surface.

11. The assembly of claim 10, wherein the first half of said clamp comprises a base with a flat upper surface and a rounded bottom surface.

12. The assembly of claim 11, wherein a notch is formed on said upper surface of the first half of said clamp.

13. The assembly of claim 11, wherein a recess is formed in the upper surface of the first half of said clamp.

14. The assembly of claim 13, wherein a notch is formed on said second half of said clamp, said notch adapted to releasably engage said recess in said first half of said clamp.

15. The assembly of claim 12, wherein a recess is formed in said second half of said clamp, said notch adapted to releasably engage said recess in said second half of said clamp.

16. The assembly of claim 10, wherein said first half of said clamp and said second half of said clamp interlock.

17. The assembly of claim 10, wherein a peg on said first half of said clamp releasably engages a corresponding aperture in said second half of said clamp.

18. The assembly of claim 10, wherein a peg on said second half of said clamp releasably engages a corresponding aperture in said first half of said clamp.

19. The assembly of claim 10, wherein said first half of said clamp is integrally formed with said rod.

20. The assembly of claim 10, wherein said second half of said clamp is integrally formed with said rod.

* * * * *